United States Patent
Ingersoll et al.

(10) Patent No.: US 9,260,966 B2
(45) Date of Patent: *Feb. 16, 2016

(54) SYSTEMS, METHODS AND DEVICES FOR THE MANAGEMENT OF HEAT REMOVAL WITHIN A COMPRESSION AND/OR EXPANSION DEVICE OR SYSTEM

(71) Applicant: General Compression, Inc., Newton, MA (US)

(72) Inventors: Eric D. Ingersoll, Cambridge, MA (US); Justin A. Aborn, Hingham, MA (US); Matthew Blieske, Francistown, NH (US)

(73) Assignee: General Compression, Inc., Newton, MA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/047,526

(22) Filed: Oct. 7, 2013

(65) Prior Publication Data

US 2014/0250880 A1    Sep. 11, 2014

Related U.S. Application Data

(63) Continuation of application No. 13/350,041, filed on Jan. 13, 2012, now Pat. No. 8,572,959.

(60) Provisional application No. 61/432,331, filed on Jan. 13, 2011.

(51) Int. Cl.
*F01P 1/00* (2006.01)
*F01B 21/04* (2006.01)
(Continued)

(52) U.S. Cl.
CPC . *F01B 29/10* (2013.01); *F02C 6/16* (2013.01); *F28D 20/0034* (2013.01); *Y02E 60/142* (2013.01); *Y02E 60/15* (2013.01)

(58) Field of Classification Search
CPC ........ F01B 29/10; F28D 20/0034; F02C 6/16; Y02E 60/15; Y02E 60/142
USPC .............................. 60/508–515; 91/4 R, 4 A
See application file for complete search history.

(56) References Cited

U.S. PATENT DOCUMENTS

| | | | |
|---|---|---|---|
| 114,297 | A | 5/1871 | Ivens at al. |
| 224,081 | A | 2/1880 | Eckart |

(Continued)

FOREIGN PATENT DOCUMENTS

| | | |
|---|---|---|
| GB | 2013318 A | 8/1979 |
| WO | WO-90/03516 A1 | 4/1990 |

(Continued)

OTHER PUBLICATIONS

Ahrens, F. W., "Preliminary Evaluation of the Use of Hydraulic Air Compressors in Water-Compensated Reservoir Compressed Air Storage PowerPlants," NTIS, Prepared for CAES Technology Symposium 1978, May 15-17, 1978, Pacific Grove, CA, Argonne National Laboratory, Argonne, Illinois, 24 pages.

(Continued)

*Primary Examiner* — Hoang Nguyen
(74) *Attorney, Agent, or Firm* — Goodwin Procter LLP

(57) ABSTRACT

Systems, methods and devices for optimizing heat transfer within a device or system used to compress and/or expand a gas, such as air, are described herein. In some embodiments, a compressed air device and/or system can include an actuator such as a hydraulic actuator that can be used to compress a gas within a pressure vessel. An actuator can be actuated to move a liquid into a pressure vessel such that the liquid compresses gas within the pressure vessel. In such a compressor/expander device or system, during the compression and/or expansion process, heat can be transferred to the liquid used to compress the air. The compressor/expander device or system can include a liquid purge system that can be used to remove at least a portion of the liquid to which the heat energy has been transferred such that the liquid can be cooled and then recycled within the system.

20 Claims, 8 Drawing Sheets

(51) Int. Cl.
    *F01B 29/10*    (2006.01)
    *F02C 6/16*     (2006.01)
    *F28D 20/00*    (2006.01)

(56) References Cited

U.S. PATENT DOCUMENTS

| | | |
|---|---|---|
| 233,432 A | 10/1880 | Pitchford |
| 320,482 A | 6/1885 | Leavitt |
| 874,140 A | 12/1907 | Valiquet |
| 943,000 A | 12/1909 | Busby |
| 1,045,961 A | 12/1912 | Ferranti |
| 1,147,204 A | 7/1915 | Anheuser |
| 1,230,028 A | 6/1917 | Rardon |
| 1,353,216 A | 9/1920 | Carlson |
| 1,369,596 A | 2/1921 | Yanacopoulos |
| 1,635,524 A | 7/1927 | Aikman |
| 1,681,280 A | 8/1928 | Earll |
| 1,918,789 A | 7/1933 | Titsworth |
| 1,947,304 A | 2/1934 | Morro |
| 2,025,142 A | 12/1935 | Zahm at al. |
| 2,042,991 A | 6/1936 | Harris, Jr. |
| 2,141,703 A | 12/1938 | Bays |
| 2,150,122 A | 3/1939 | Kollberg at al. |
| 2,280,100 A | 4/1942 | Singleton |
| 2,280,845 A | 4/1942 | Parker |
| 2,339,086 A | 1/1944 | Makaroff |
| 2,404,660 A | 7/1946 | Rouleau |
| 2,420,098 A | 5/1947 | Rouleau |
| 2,454,058 A | 11/1948 | Hays |
| 2,479,856 A | 8/1949 | Mitton |
| 2,539,862 A | 1/1951 | Rushing |
| 2,628,564 A | 2/1953 | Jacobs |
| 2,683,964 A | 7/1954 | Anxionnaz et al. |
| 2,706,077 A | 4/1955 | Searcy |
| 2,712,728 A | 7/1955 | Lewis et al. |
| 2,813,398 A | 11/1957 | Wilcox |
| 2,824,687 A | 2/1958 | Osterkamp |
| 2,829,501 A | 4/1958 | Walls |
| 2,880,759 A | 4/1959 | Wiseman |
| 2,898,183 A | 8/1959 | Fauser |
| 3,014,639 A | 12/1961 | Boli |
| 3,041,842 A | 7/1962 | Heinecke |
| 3,232,524 A | 2/1966 | Rice at al. |
| 3,236,512 A | 2/1966 | Caslav at al. |
| 3,269,121 A | 8/1966 | Ludwig |
| 3,355,096 A | 11/1967 | Hornschuch |
| 3,523,192 A | 8/1970 | Lang |
| 3,530,681 A | 9/1970 | Dehne |
| 3,538,340 A | 11/1970 | Lang |
| 3,608,311 A | 9/1971 | Roesel, Jr. |
| 3,618,470 A | 11/1971 | Muelier at al. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Rigollot |
| 3,792,643 A | 2/1974 | Scheafer |
| 3,793,848 A | 2/1974 | Eskeli |
| 3,796,044 A | 3/1974 | Schwarz |
| 3,801,793 A | 4/1974 | Goebel |
| 3,802,795 A | 4/1974 | Nyeste et al. |
| 3,803,847 A | 4/1974 | McAlister |
| 3,806,733 A | 4/1974 | Haanen |
| 3,818,801 A | 6/1974 | Kime |
| 3,832,851 A | 9/1974 | Kiernan |
| 3,835,918 A | 9/1974 | Pilarczyk |
| 3,839,863 A | 10/1974 | Frazier |
| 3,847,182 A | 11/1974 | Greer |
| 3,854,301 A | 12/1974 | Cytryn |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,968,732 A | 7/1976 | Fitzgerald |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 4,008,006 A | 2/1977 | Bea |
| 4,009,587 A | 3/1977 | Robinson, Jr. et al. |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,053,395 A | 10/1977 | Switzgable |
| 4,055,950 A | 11/1977 | Grossman |
| 4,058,979 A | 11/1977 | Germain |
| 4,079,586 A | 3/1978 | Kincaid, Jr. |
| 4,079,591 A | 3/1978 | Derby et al. |
| 4,089,744 A | 5/1978 | Cahn |
| 4,090,940 A | 5/1978 | Switzgable |
| 4,095,118 A | 6/1978 | Rathbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,343 A | 9/1978 | Hoffeins |
| 4,117,696 A | 10/1978 | Fawcett et al. |
| 4,118,637 A | 10/1978 | Tackett |
| 4,124,182 A | 11/1978 | Loeb |
| 4,124,805 A | 11/1978 | Jacoby |
| 4,126,000 A | 11/1978 | Funk |
| 4,136,432 A | 1/1979 | Melley, Jr. |
| 4,137,015 A | 1/1979 | Grossman |
| 4,142,368 A | 3/1979 | Mantegani |
| 4,143,522 A | 3/1979 | Hamrick et al. |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,601 A | 6/1980 | Eberle |
| 4,206,608 A | 6/1980 | Bell |
| 4,209,982 A | 7/1980 | Pitts |
| 4,215,548 A | 8/1980 | Beremand |
| 4,220,006 A | 9/1980 | Kindt |
| 4,229,143 A | 10/1980 | Pucher et al. |
| 4,229,661 A | 10/1980 | Mead et al. |
| 4,232,253 A | 11/1980 | Mortelmans |
| 4,236,083 A | 11/1980 | Kenney |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege et al. |
| 4,265,599 A | 5/1981 | Morton |
| 4,273,514 A | 6/1981 | Shore et al. |
| 4,274,010 A | 6/1981 | Lawson-Tancred |
| 4,275,310 A | 6/1981 | Summers et al. |
| 4,281,256 A | 7/1981 | Ahrens et al. |
| 4,293,323 A | 10/1981 | Cohen |
| 4,299,198 A | 11/1981 | Woodhull |
| 4,302,684 A | 11/1981 | Gogins |

(56) References Cited

U.S. PATENT DOCUMENTS

| | | |
|---|---|---|
| 4,304,103 A | 12/1981 | Hamrick et al. |
| 4,311,011 A | 1/1982 | Lewis |
| 4,316,096 A | 2/1982 | Syverson |
| 4,317,439 A | 3/1982 | Emmerling |
| 4,329,842 A | 5/1982 | Hoskinson |
| 4,335,093 A | 6/1982 | Salomon |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,362,462 A | 12/1982 | Blotenberg |
| 4,363,703 A | 12/1982 | ElDifrawi et al. |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,372,332 A | 2/1983 | Mast |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,426,846 A | 1/1984 | Bailey |
| 4,426,847 A | 1/1984 | Fischer |
| 4,428,711 A | 1/1984 | Archer |
| 4,435,131 A | 3/1984 | Ruben |
| 4,466,244 A | 8/1984 | Wu |
| 4,478,556 A | 10/1984 | Gozzi |
| 4,537,558 A | 8/1985 | Tsunoda et al. |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini et al. |
| 4,765,225 A | 8/1988 | Birchard |
| 4,784,579 A | 11/1988 | Gazzera |
| 4,849,648 A | 7/1989 | Longardner |
| 4,959,958 A | 10/1990 | Nishikawa et al. |
| 5,058,385 A | 10/1991 | Everett, Jr. |
| 5,099,648 A | 3/1992 | Angle |
| 5,138,936 A | 8/1992 | Kent |
| 5,142,870 A | 9/1992 | Angle |
| 5,161,865 A | 11/1992 | Higashimata et al. |
| 5,169,295 A | 12/1992 | Stogner et al. |
| 5,179,837 A | 1/1993 | Sieber |
| 5,184,936 A | 2/1993 | Nojima |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,899,071 A | 5/1999 | Stone et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,474,058 B1 | 11/2002 | Warren |
| 6,484,498 B1 | 11/2002 | Bonar, II |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| RE39,249 E | 8/2006 | Link, Jr. |
| 7,210,496 B2 | 5/2007 | Suzuki |
| 7,219,682 B2 | 5/2007 | Agnew et al. |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 | 5/2009 | Hornstein |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 8,061,133 B2 | 11/2011 | Loeffler |
| 8,065,876 B2 | 11/2011 | Walpita |
| 8,572,959 B2 * | 11/2013 | Ingersoll et al. ................ 60/512 |
| 2003/0180155 A1 | 9/2003 | Coney et al. |
| 2005/0180864 A1 | 8/2005 | Ursan et al. |
| 2006/0078445 A1 | 4/2006 | Carter et al. |
| 2006/0218908 A1 | 10/2006 | Abou-Raphael |
| 2006/0248886 A1 | 11/2006 | Ma |
| 2007/0187918 A1 | 8/2007 | Mizuno et al. |
| 2008/0060862 A1 | 3/2008 | Schiele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |

(56) References Cited

U.S. PATENT DOCUMENTS

| | | |
|---|---|---|
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |

FOREIGN PATENT DOCUMENTS

| | | |
|---|---|---|
| WO | WO-93/06367 A1 | 4/1993 |
| WO | WO-98/17492 A1 | 4/1998 |
| WO | WO-2005/069847 A2 | 8/2005 |
| WO | WO-2008/139267 A1 | 11/2008 |
| WO | WO-2009/034548 A2 | 3/2009 |
| WO | WO-2010/135658 A2 | 11/2010 |
| WO | WO-2011/079267 A1 | 6/2011 |
| WO | WO-2011/079271 A2 | 6/2011 |

OTHER PUBLICATIONS

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15.

Carbon Trust, "Hydraulic Transmission System for Large Wind Turbines," Jan. 2007, 1 page.

Cyphelly et al., "Usage of Compressed Air Storage Systems," Program Elektricity, Final Report May 2004, Ordered by the Swiss Federal Office of Energy.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL:http://www.hydraulicspneumatics.com/200/issue/article/true/43640>, 2007, Penton Media, Inc., 13 pages.

International Search Report and Written Opinion for International Application No. PCT/US2010/035795, mailed Oct. 13, 2011.

International Search Report and Written Opinion for International Application No. PCT/US2010/062010, mailed Apr. 13, 2011.

International Search Report and Written Opinion for International Application No. PCT/US2010/062016, mailed Jan. 19, 2012.

International Search Report and Written Opinion for International Application No. PCT/US2012/021189, mailed Apr. 10, 2012 (12 pages).

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson, A. E., "Hydraulic System for Control of Power Windmills," undated, 11 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Simetric, "Mass, Weight, Density or Specific Gravity of Liquids," [online], [retrieved on Jan. 2, 2008]. Retrieved from the Internet: <URL: http://www.simetric.co.uk/si.sup.--liquids.htm>, 5 pages.

"Swash-plate Type Axial Piston Pumps for Open Circuits in General Industrial Machinery," Kawasaki K3VG, Kawasaki Motor Corp., USA, 2006, 24 pages.

* cited by examiner

SYSTEMS, METHODS AND DEVICES FOR THE MANAGEMENT OF HEAT REMOVAL WITHIN A COMPRESSION AND/OR EXPANSION DEVICE OR SYSTEM

CROSS-REFERENCE TO RELATED APPLICATION

This application is a continuation of U.S. patent application Ser. No. 13/350,041, entitled "Systems, Methods and Devices for the Management of Heat Removal within a Compression and/or Expansion Device or System," filed on Jan. 13, 2012, which claims priority to and the benefit of U.S. Provisional Patent Application No. 61/432,331, entitled "Systems, Methods and Devices for the Management of Heat Removal within a Compression and/or Expansion Device or System," filed on Jan. 13, 2011, the disclosures of which are hereby incorporated by reference herein in their entireties.

BACKGROUND

The invention relates generally to systems, devices and methods for the compression and/or expansion of a gas, such as air, and particularly to a system, device and method for optimizing heat transfer during the compression and/or expansion of a gas.

Some known devices, methods and systems used to compress and/or expand a gas, such as air, and/or to pressurize and/or pump a liquid, such as water, can be used, for example, within a compressed air energy storage system. In some compressed air devices and systems, a hydraulic actuator can be used to move or compress air within a pressure vessel. For example, an actuator can move a liquid within a pressure vessel such that the liquid compresses air in the pressure vessel.

Such known devices and systems used to compress and/or expand a gas and/or to pressurize and/or pump a liquid can change the temperature of the gas during, for example, a compression or expansion process. For example, compressing a gas can convert heat energy from its latent form into its sensible form, thereby increasing the temperature of the gas. Various heat transfer mechanisms can be used to remove heat energy from the gas being compressed during the compression process. In some known devices and systems, heat energy in the gas being compressed within a pressure vessel can also be transferred to the liquid used to compress the gas.

Thus, there is a need to improve and/or optimize the heat transfer devices and methods used to transfer heat during a compression and/or expansion process within such devices and systems used to compress and/or expand a gas.

SUMMARY OF THE INVENTION

Systems, methods and devices for optimizing heat transfer within a device or system used to compress and/or expand a gas, such as air, are described herein. In some embodiments, a compressed air device and/or system can include an actuator such as a hydraulic actuator that can be used to compress a gas within a pressure vessel. An actuator can be actuated to move a liquid into a pressure vessel such that the liquid compresses gas within the cylinder or pressure vessel. In such a compressor/expander device or system, during the compression and/or expansion process, heat can be transferred to the liquid used to compress the air. The compressor and/or expander device or system can include a liquid purge system that can be used to remove at least a portion of the liquid to which the heat energy has been transferred such that the liquid can be cooled and then recycled within the system.

DETAILED DESCRIPTION

Figure 1:
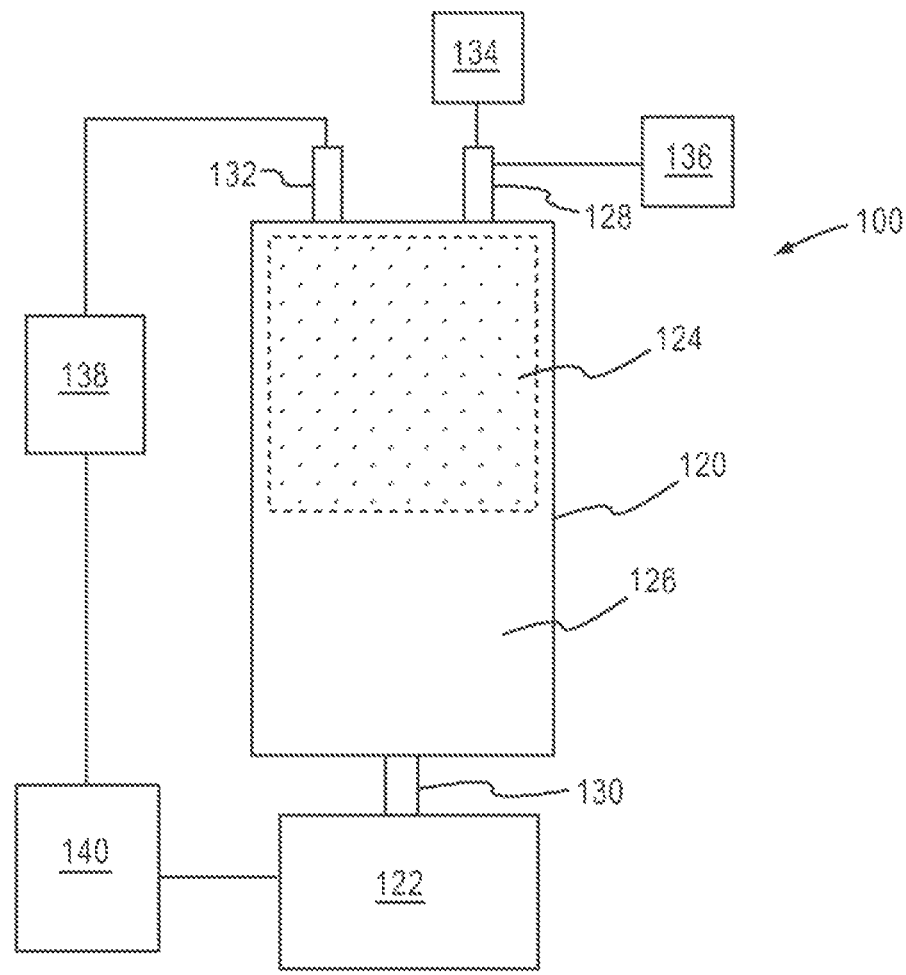
FIG. 1 is a schematic illustration of a compression and/or expansion system according to an embodiment.
Figure 2:
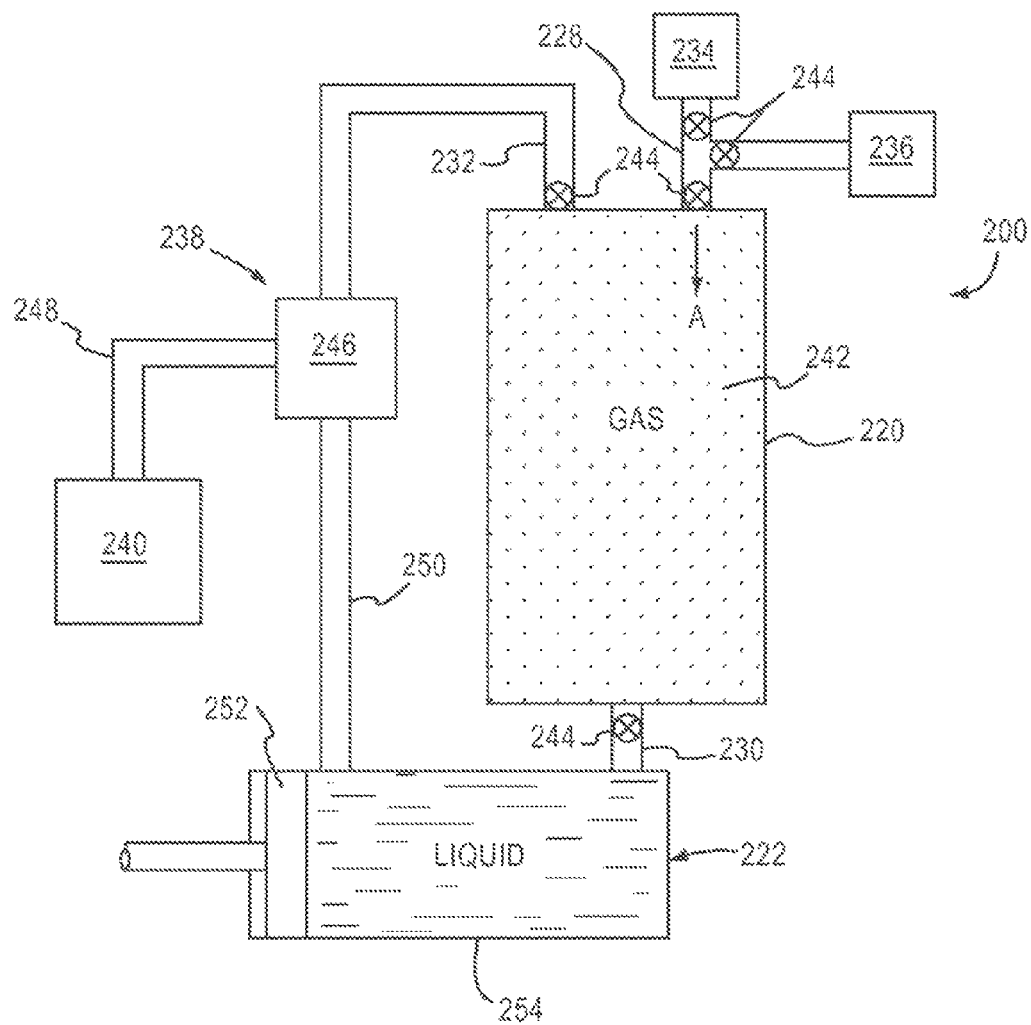
FIG. 2 is a schematic illustration of a compression and/or expansion device according to an embodiment, showing a first time period of a compression cycle.
Figure 3:
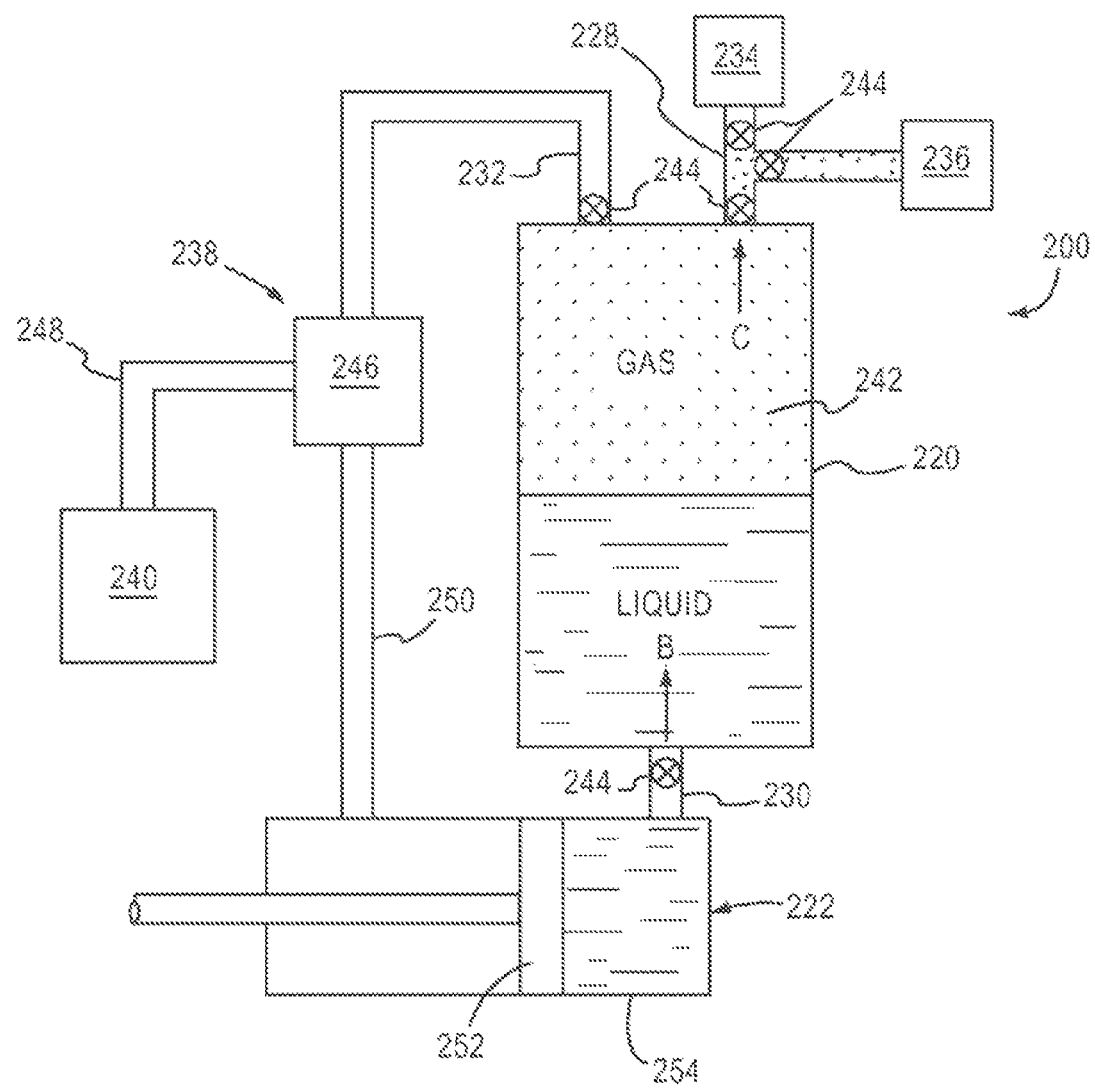
FIG. 3 is a schematic illustration of the compression and/or expansion device of FIG. 2 showing a second time period of a compression cycle.

Systems, methods and devices used to compress and/or expand a gas, such as air, and/or to pressurize and/or pump a liquid, such as water, are described herein. Such devices and systems can be used, for example, within a compressed air energy storage (CAES) system. In some compression and/or expansion devices and systems, a hydraulic actuator can be used to move or compress a gas within a pressure vessel. For example, an actuator can move a liquid within a pressure vessel such that the liquid compresses the gas in the pressure vessel. Such compression devices and systems are described in U.S. Provisional App. No. 61/216,942 and U.S. Patent Publication Nos. 2011/0061741, 2011/0061836 and 2011/0062166, each entitled "Compressor and/or Expander Device" (collectively referred to as "the Compressor and/or Expander Device applications"), incorporated herein by reference in their entirety. The Compressor and/or Expander Device applications describe a CAES system that can include multiple stages of compression and/or expansion. Other examples of devices and systems for expanding and/or compressing as gas are described in U.S. patent application Ser. No. 12/977,724 to Ingersoll et al. ("the Ingersoll I application"), entitled "System and Methods for Optimizing Efficiency of a Hydraulically Actuated System," and U.S. patent application Ser. No. 12/977,679 to Ingersoll et al. ("the Ingersoll II application"), entitled "Methods and Devices for Optimizing Heat Transfer Within a Compression and Expansion Device," the disclosures of which are incorporated herein by reference in their entirety.

In some compression and/or expansion devices and systems, a piston can be movably disposed within a cylinder or pressure vessel and actuated to compress air within the cylinder or pressure vessel. Such a device can include a single-acting piston configured to compress gas when moved in a single direction, or a double-acting piston configured to compress gas when moved in either direction. Examples of such compressed air devices and systems are described in U.S. Patent App. No. 61/420,505 to Ingersoll et al. ("the Ingersoll III application"), entitled "Compressor and/or Expander Device with Rolling Piston Seal," the disclosure of which is incorporated herein by reference in its entirety.

In some embodiments, the devices and systems described herein can be configured for use only as a compressor. For example, in some embodiments, a compressor device described herein can be used as a compressor in a natural gas pipeline, a natural gas storage compressor, or any other industrial application that requires compression of a gas. In another example, a compressor device described herein can be used for compressing carbon dioxide. For example, carbon dioxide can be compressed in a process for use in enhanced oil recovery or for use in carbon sequestration.

In some embodiments, the devices and systems described herein can be configured for use only as an expansion device. For example, an expansion device as described herein can be used to generate electricity. In some embodiments, an expansion device as described herein can be used in a natural gas transmission and distribution system. For example, at the intersection of a high pressure (e.g., 500 psi) transmission system and a low pressure (e.g., 50 psi) distribution system, energy can be released where the pressure is stepped down from the high pressure to a low pressure. An expansion device as described herein can use the pressure drop to generate electricity. In other embodiments, an expansion device as described herein can be used in other gas systems to harness the energy from high to low pressure regulation.

In some embodiments, a compression and/or expansion device (also referred to herein as compressor/expander device) as described herein can be used in an air separation unit. In one example application, in an air separator, a compression and/or expansion device can be used in a process to liquefy a gas. For example, air can be compressed until it liquefies and the various constituents of the air can be separated based on their differing boiling points. In another example application, a compression and/or expansion device can be used in an air separator co-located within a steel mill where oxygen separated from the other components of air is added to a blast furnace to increase the burn temperature.

A compression and/or expansion system can have a variety of different configurations and can include one or more actuators that are used to compress/expand a gas (e.g. air), within a compression/expansion device. In some embodiments, an actuator can include one or more pump systems, such as for example, one or more hydraulic pumps and/or one or more pneumatic pumps that can be use to move one or more fluids within the system between various water pumps and pressure vessels. As used herein, "fluid" can mean a liquid, gas, vapor, suspension, aerosol, or any combination thereof. The Compressor and/or Expander Device applications incorporated by reference above describe various energy compression and expansion systems in which the systems and methods described herein can be employed.

As described herein, devices and systems used to compress and/or expand a gas, such as air, and/or to pressurize and/or pump a liquid, such as water, can release heat during, for example, a compression process and/or can absorb heat during, for example, an expansion process. The devices and systems described herein can include one or more heat transfer mechanisms to remove and/or add heat during the compression and/or expansion processes. In some embodiments, a heat transfer element can be used as described, for example, in the Compressor and/or Expander Device applications and/or the Ingersoll II application incorporated by reference above. During an expansion process in a CAES system, when compressed air is released from a storage structure and expanded through the compressor/expander system, heat from a source can be added to the air to increase the power generated during the expansion process. In some embodiments, the source of heat can be at a relatively low temperature (e.g., between, for example, about 10° C. and about 50° C.).

In some embodiments, a heat transfer element can be positioned within the interior of a pressure vessel of a compressor/expander device to increase the amount of surface area within the pressure vessel that is in direct or indirect contact with gas, which can improve heat transfer. The heat transfer element may be configured to minimize the distance that heat must travel through the air in order to reach the heat transfer element, such as a maximum distance of ⅛", and other distances. The heat transfer element can provide for an increased heat transfer area both with gas that is being compressed and with gas that is being expanded (through a gas/liquid interface area and/or gas/heat transfer element interface), while allowing the exterior structure and overall shape and size of a pressure vessel to be optimized for other considerations, such as, for example, pressure limits and/or shipping size limitations. In some embodiments, the heat transfer element can be a thermal capacitor that absorbs and holds heat released from a gas that is being compressed, and then releases the heat to a gas or a liquid at a later time. In some embodiments, the heat transfer element can be a heat transferring device that absorbs heat from a gas that is being compressed, and then facilitates the transfer of the heat outside of the pressure vessel.

In some embodiments, heat energy can be removed from a gas during compression via a liquid that is present in one or more pressure vessels of a compressor/expander device to maintain the gas that is being compressed at a relatively constant temperature. The heat energy can be transferred from the gas to the liquid and/or the compressor and/or expander device to a heat transfer element disposed within the pressure vessel. After gas is provided to the compressor/expander device, heat energy is removed from the gas, i.e. the gas is kept cooler as it is compressed than would be the case without the heat transfer element, and may be done to an extent that the temperature of the gas remains relatively constant. The temperature of the gas can be maintained, for example, at about 5° C., 10° C., 20° C., 30° C. or other temperatures that may be desirable, until discharged to, for example, a compressed gas storage structure or a subsequent compression stage. The gas stored in the storage structure may be heated (or cooled) naturally through conductive and/or convective heat transfer if the storage structure is naturally at a higher (or lower) temperature. For example, in some cases, the storage structure may be an underground structure, such as a salt cavern constructed in a salt dome that is used for storing the compressed gas. In some embodiments, the heat transfer element can be designed such that the temperature of the gas does not remain relatively constant, but instead increases a relatively small amount, for example, 5° C., 10° C., 20° C., 30° C.

As discussed above, heat may be added to the gas during an expansion process. For example, heat can be added to the gas at each of the stages of a multi-stage compression/expansion system to hold gas temperatures at a substantially constant temperature, such as at about 35° C., or other temperatures, during the entire expansion process. The overall temperature change of gas during expansion may be limited by a relatively large amount of gas that expands in a relatively small volume of a pressure vessel, and that is in contact with substantial heat transfer surfaces.

As discussed above, heat can be transferred from and/or to gas that is compressed and/or expanded by liquid (e.g., water) within a pressure vessel. A gas/liquid or gas/heat element interface may move and/or change shape during a compression and/or expansion process in a pressure vessel. This movement and/or shape change may provide a compressor/expander device with a heat transfer surface that can accommodate the changing shape of the internal areas of a pressure vessel in which compression and/or expansion occurs. In some embodiments, the liquid may allow the volume of gas remaining in a pressure vessel after compression to be nearly eliminated or completely eliminated (i.e., zero clearance volume).

A liquid (such as water) can have a relatively high thermal capacity as compared to a gas (such as air) such that a transfer of an amount of heat energy from the gas to the liquid avoids a significant increase in the temperature of the gas, but incurs only a modest increase in the temperature of the liquid. This allows buffering of the system from substantial temperature changes. Said another way, this relationship creates a system that is resistant to substantial temperature changes. Heat that is transferred between the gas and liquid, or components of the vessel itself, may be moved from or to the pressure vessel through one or more processes. In some embodiments, heat can be moved in or out of the pressure vessel using mass transfer of the compression liquid itself. In other embodiments, heat can be moved in or out of the pressure vessel using heat exchange methods that transfer heat in or out of the compression liquid without removing the compression liquid from the pressure vessel. Such heat exchangers can be in thermal contact with the compression liquid, components of the pressure vessel, a heat transfer element, or any combination thereof. Furthermore, heat exchangers may also use mass transfer to move heat in or out of the pressure vessel. One type of heat exchanger that can be used to accomplish this heat transfer is a heat pipe as described in the Compressor and/or Expander Device applications and the Ingersoll I application incorporated by reference above. Thus, the liquid within a pressure vessel can be used to transfer heat from gas that is compressed (or to gas that is expanded) and can also act in combination with a heat exchanger to transfer heat to an external environment (or from an external environment).

In some embodiments, heat can be transferred from a gas (such as air) that is compressed in a pressure vessel to increase the efficiency of the compression process. Heat can be transferred from the gas to a liquid, and/or from the gas to a heat transfer element within the compression vessel, and/or from the compression liquid while it is inside or outside of the pressure vessel. The amount of heat transferred from an amount of gas being compressed can depend on the rate of heat transfer from the gas and on the time over which the heat transfer takes place, i.e. over the cycle time during which the gas compression takes place. Thus, for a given rate of heat transfer that can be achieved by a system, the more slowly the system is operated (i.e., the longer the compression cycle times), the more closely the compression cycle can approach isothermal compression. However, slower compression cycle times also correlate to lower gas volumetric and/or mass flow rates. In the context of a CAES system, this equates to lower energy storage rates, equivalently known as lower power. Conversely, in a gas expansion process, the more slowly the system is operated, the more heat energy can be transferred to the expanding gas (for a given heat transfer rate) and the more closely the expansion cycle can approach isothermal expansion, which may correspond to more efficient consumption of air mass relative to energy extracted/converted. However, in the context of a CAES system, the resulting lower expanding gas flow rate may equate to lower power production.

The use of a liquid (e.g. water) as a medium through which heat passes (directly through contact between the gas and liquid, or indirectly through an intermediary material) during compression and/or expansion may allow for continuous cooling or heating at enhanced heat transfer rates and may provide a mechanism by which heat may be moved in and/or out of the pressure vessel. That is, during compression, the liquid may receive heat from gas that is being compressed and transfer this heat from the pressure vessel to the external environment continuously, both while gas is being compressed and while gas is being received by the pressure vessel for later compression. Similarly, heat addition may occur when a compressor/expander device is operating in an expansion mode both during expansion, and as expanded gas is passed from the pressure vessel.

The heat energy transferred from the gas to the liquid can be removed from the pressure vessel by transferring the heat energy from the liquid to or through some other medium to the surrounding environment or other location outside the pressure vessel. Alternatively, or in addition, the water itself can be transferred out of the pressure vessel (along with the stored heat energy). Thus, in some embodiments, a compression and/or expansion device can include a liquid purge system that can remove some or all of the liquid used to receive heat energy from a gas compressed within a pressure vessel (or liquid used to provide heat energy to a gas expanded within the pressure vessel). For example, in such a compression and/or expansion device, heat energy can be transferred from the gas to the liquid, and a volume of the heated liquid can then be purged from the pressure vessel to a location where the heated liquid can be cooled. Once cooled, the liquid can be cycled back into the system for use in compressing the gas within a pressure vessel. In some embodiments, all of the liquid used to compress the gas within a pressure vessel can be purged from the pressure vessel. In some embodiments, the purged liquid can be discharged to the next stage in a multi-stage compression/expansion system.

In some embodiments, only a predetermined portion or volume of the liquid used to compress the gas within a pressure vessel is purged. Depending on, for example, the geometry of the system, the rate of heat transfer, and/or the cycle time, there may be a significant temperature gradient in the liquid contained in the pressure vessel. For example, if a column of water is exposed at its surface to the gas during compression (e.g., if the water column, driven by a mechanical piston, is used to compress the gas) heat energy transferred though the surface and into the water column will create a temperature gradient in which the surface is at the highest temperature and the temperature decreases through the column with distance from the surface. The profile of the gradient may be such that a large portion of the total heat energy transferred from the gas to the liquid is contained in a relatively thin layer of the fluid adjacent the surface. Thus, it may be desirable to remove or evacuate only a predetermined portion or volume of liquid in that layer, closest to the gas being compressed. The volume of liquid to be purged can be selected so as to remove a desired amount of heat energy from the compression and/or expansion device or system at an acceptable cost in operating energy and/or equipment cost, and with an acceptable impact on cycle time, to purge that volume of liquid from the device and to replace it. By evacuating only a portion of the volume of liquid used to compress the gas, the cycle time of the compression and/or expansion process can be reduced. Additionally, with shorter cycle times, less actuating power may be needed, and therefore, the compression and/or expansion device can include smaller and/or less expensive actuators to pump the compression liquid within the system.

Thus, in some embodiments, the stroke of the compression cycle can be tailored to the needs of the particular system or facility, trading off energy storage rates against operating efficiency. For example, in a given CAES system, it may be desirable to operate with a stroke time for the compression cycle of, for example, 3 seconds to generate a maximum energy storage rate (limited by operating constraints such as actuator power). Alternatively, if a lower energy storage rate is acceptable, it may be desirable to operate at higher energy efficiency, with a compression cycle of, for example, 6.5 seconds.

In some embodiments, it may be desirable for the temperature of the compression/heat transfer liquid (e.g., water) to approach the temperature of the gas (e.g., air) as closely as possible during a compression cycle so as to not degrade waste heat. For example, if during a compression cycle the gas increases in temperature by 3 degrees, it may be desirable for the liquid at the top layer (e.g., closes to the gas) to increase, for example, 2 degrees. This top layer of liquid can be transferred out of the pressure vessel at the end of the compression cycle, and the system can be replenished with a new layer of liquid. This can provide a system with entropy minimization.

In some embodiments, for example, within a multi-stage CAES system, a liquid purge system can be included at each stage in the system. In some embodiments, only one stage may include a liquid purge system. For example, a first stage of a CAES system may include a liquid purge system, and the remaining stages may include heat exchangers or other methods to remove heat generated during a compression cycle. In some embodiments, more than one stage, but not all stages, can include a liquid purge system.

In some embodiments, a compression and/or expansion device can include a liquid purge system and also include one or more heat transfer elements (e.g., a heat transfer element as described in the Ingersoll II application incorporated by reference above) disposed within the pressure vessel. In such an embodiment, some of the heat energy can be transferred to the heat transfer element(s), and some of the heat energy can be transferred to the compression liquid. In some embodiments, the compression and/or expansion device can include a liquid purge system and not include a heat transfer element.

FIG. 1 schematically illustrates a portion of a compression and/or expansion device (also referred to herein as "compression/expansion device") according to an embodiment. A compression/expansion device 100 can include one or more pressure vessels 120 (also referred to herein as "cylinder") having a working chamber 126, an actuator 122 by which the volume of working chamber 126, and/or the portion of the volume of the working chamber 126 that can be occupied by gas, can be changed (decreased to compress the gas, increased to expand the gas), and one or more heat transfer elements 124 disposed within the working chamber 126. The compression/expansion device 100 also includes a liquid purge system 138 coupled to the working chamber 126 and the actuator 122. The compression/expansion device 100 can be used, for example, to compress or expand a gas, such as air, within the working chamber 126. The compression/expansion device 100 can be used, for example, in a CAES system.

The compression/expansion device 100 can include a gas inlet/outlet conduit 128 (also referred to as "gas inlet/outlet"), a first liquid inlet/outlet conduit (also referred to as "first liquid inlet/outlet") 130 and a second liquid inlet/outlet conduit (also referred to as "second liquid inlet/outlet") 132, each in fluid communication with the working chamber 126. In alternative embodiments, the compression/expansion device 100 can include more or less inlet/outlet conduits. For example, in some embodiments, two gas inlet/outlet conduits can be included. In some embodiments, a separate gas inlet conduit and gas outlet conduit and/or a separate liquid inlet and liquid outlet conduit can be included, each in fluid communication with the working chamber 126.

The working chamber 126 can contain at various time periods during a compression and/or expansion cycle, a liquid (e.g., water) that can be communicated to and from the working chamber 126 of the pressure vessel 120 via the first liquid inlet/outlet 130 and/or the second liquid inlet/outlet 132, and/or a gas (e.g., air) that can be communicated to and from the working chamber 126 via the inlet/outlet 128. The compression/expansion device 100 can also include multiple valves (not shown in FIG. 1) coupled to the gas inlet/outlet 128, the first liquid inlet/outlet 130 and the second liquid inlet/outlet 132 and/or to the pressure vessel 120. The valves can be configured to operatively open and close the fluid communication to and from the working chamber 126. Examples of use of such valves are described in more detail in the Compressor and/or Expander Device applications incorporated by reference above.

The actuator 122 can be any suitable mechanism for selectively changing the volume of the working chamber 126 and/or the portion of the volume of the working chamber that can be occupied by gas. For example, the working chamber 126 can be defined by a cylinder and the face of a piston (not shown in FIG. 1) disposed for reciprocal movement within the cylinder. Movement of the piston in one direction would reduce the volume of the working chamber 126, thus compressing gas contained in the working chamber 126, while movement of the piston in the other direction would increase the volume of the working chamber 126, thus expanding gas contained in the working chamber 126. The actuator 122 can thus be the piston and a suitable device for moving the piston within the cylinder, such as a pneumatic or hydraulic actuator such as, for example, the hydraulic actuators described in the Ingersoll I application.

In some embodiments, the working chamber 126 can have a fixed volume, i.e. a volume defined by a chamber with fixed boundaries, and the portion of the volume of the working chamber 126 that can be occupied by gas can be changed by introducing a liquid into, or removing a liquid from, the working chamber 126. Thus, the total volume of the working chamber 126 can include a first portion containing a volume of liquid, and a second portion that can contain a volume of gas. In such embodiments, the actuator 122 can be any suitable device for introducing liquid into, or removing liquid from, the working chamber 126, such as a hydraulic actuator that can move a liquid in and out of the working chamber 126 via liquid inlet/outlet conduit 130. In such an embodiment, the actuator 122 can include a water pump (not shown) that drives a hydraulically driven piston (not shown) disposed within a housing (not shown) and can be driven with one or more hydraulic pumps (not shown) to move a volume of liquid in and out of the working chamber 126. An example of such a hydraulic actuator is described in the Compressor and/or Expander Device applications incorporated by reference above.

In some embodiments, the working chamber can be configured to combine the techniques described above, i.e. the working chamber can have a variable volume, e.g. using a cylinder and piston as described above, and the portion of the variable volume that can be occupied by gas can be changed by introducing liquid into, or removing a liquid from, the working chamber. In another embodiment, a constant volume of liquid can be maintained in the variable volume working chamber throughout all, or a portion, of the compression cycle.

The gas inlet/outlet 128 can be coupled to a source of gas 134, such as, for example, a source of ambient air (at ambient pressure, or pre-pressurized by another compression system), and can also be coupled to a compressed gas storage structure 136 to which gas can be transferred after being compressed. The valves can be used to open and close the fluid communication between the pressure vessel 120 and the source of gas 134 and between the pressure vessel 120 and the storage structure 136. The first liquid inlet/outlet 130 can be coupled to the actuator 122 and can be opened and closed via a valve to communicate a volume of liquid inside and/or out of the pressure vessel 120. The second liquid inlet/outlet 132 can be coupled to the liquid purge system 138 and opened via a valve to evacuate a volume of the liquid from the pressure vessel 120, as described in more detail below.

The heat transfer element 124 can be a variety of different configurations, shapes, sizes, structures, etc. to provide a relatively high surface area per unit volume or mass that can be in contact with the gas (e.g., air) as it is being compressed or expanded within the working chamber 126. In some embodiments, it may be desirable to include a heat transfer element 124 that can be formed with a material that can provide high thermal conductivity in a transverse and a longitudinal direction within the working chamber 126. The heat transfer element 124 can be formed from one or more of a variety of different materials. For example, the heat transfer element 124 can be formed with metals (e.g. stainless steel), metal wires, hybrid wires, carbon fiber, nano-materials, and composite materials (e.g. carbon polymer compounds) which have anti-corrosion properties, are lighter weight, and are less expensive than some metallic materials.

The heat transfer element 124 can be disposed at various locations within the working chamber 126 so as to optimize the heat transfer within the pressure vessel 120. For example, in some embodiments, the heat transfer element 124 can be disposed within the working chamber 126 near an end portion of the working chamber 126 in a portion occupied by the gas (e.g., air) near the end of a compression cycle. As the gas is compressed during the compression cycle, the work done on the gas adds energy to the gas. During the compression cycle heat energy is continuously transferred (primarily by conductive and/or convective, rather than radiant, heat transfer) to the heat transfer element 124. This transfer maintains the gas temperature at a lower value than would be the case without the heat transfer element 124, and moderately increases the temperature of the heat transfer element 124.

The actuator 122 can be, for example a hydraulic actuator that can move a liquid in and out of the working chamber 126 via the first liquid inlet/outlet 130. In such an embodiment, the actuator 122 can include a water pump (not shown) in which a piston can be driven with one or more hydraulic pumps (not shown) to move a volume of liquid in and out of the working chamber 126. An example of such a hydraulic actuator is described in the Compressor and/or Expander Device applications and the Ingersoll I application. In some embodiments, the actuator 122 can be coupled to, for example, an electric motor/generator and/or a hydraulically driven actuator such as, for example, the hydraulic actuators described in the Ingersoll I application incorporated by reference above.

The liquid purge system 138 can include a pump (not shown) that can be actuated to move liquid from the working chamber 126 to a thermal management facility 140. The pump can also be used to pump liquid from the thermal management facility 140 to the actuator 122. The thermal management facility 140 can include, for example, a cooling tower or a containment pond, where heated liquid removed from the working chamber 126 can be cooled to a desired temperature. The cooled liquid can be cycled back into the actuator 122 and used again in a compression process as described in more detail below.

The thermal management facility 140 can also include a source of heat such as, for example, low grade or waste heat from an industrial plant, so that heat can be added to the liquid before it is cycled back into the actuator 122 and used in an expansion process. In this manner, heat can be added to the gas to increase the electricity generation from the expansion process and/or increase the overall efficiency of the expansion process. For example, heat can be added to the gas at each of the stages of a multi-stage compression/expansion system to maintain gas temperatures at a substantially constant temperature, such as at about 35° C., or other temperatures, during the entire expansion process.

As described above, in some embodiments, the working chamber 126 can contain a liquid. The actuator 122 can be used to change the portion of the working chamber 126 that is available to contain gas, by moving a liquid, such as water, into and out of the working chamber 126 such that gas, such as air, within the working chamber 126 is compressed by the liquid. In such embodiments, depending on the rate at which the working chamber 126 is filled with liquid, and the heat transfer properties of the heat transfer element 124, the gas and the heat transfer element 124 will be relatively closer or farther from thermal equilibrium. Thus, during some or all of the compression cycle, the liquid in the working chamber 126 can be caused to contact the heat transfer element 124 to receive from the heat transfer element 124 heat energy it received from the compressed gas. Optionally, at the end of the compression cycle, any pressurized gas remaining in the working chamber 126 can be released from the working chamber 126 and transferred to the next step or stage in the compression process, or to a storage facility. Liquid can then be moved into the working chamber 126 to substantially fill the volume previously occupied by gas that was moved from the working chamber 126 after compression (e.g., by introducing more liquid and/or by reducing the volume of the working chamber (e.g. by moving a piston)). The heat energy stored in the heat transfer element 124 can then be transferred (again, by conductive and/or convective transfer) to the water in the working chamber 126.

In one example use of the compression/expansion device 100, a first quantity of gas having a first pressure can be introduced into the working chamber 126 via the gas inlet/outlet 128. For example, a gas source 134 can be coupled to the gas inlet/outlet 128. The gas source can supply, for example, ambient air. A valve or valves coupled to the gas inlet/outlet 128 can be opened to allow a quantity of gas (e.g., air) to enter the working chamber 126. With the first quantity of gas disposed within the working chamber 126, the valve coupled to the gas inlet/outlet 128 can be closed and optionally, a valve coupled to the liquid inlet/outlet 130 can be opened. The actuator 122 can then pump a volume (or quantity) of liquid (e.g., water) into the working chamber 126 via the first liquid inlet/outlet 130. The volume of liquid can be pumped into the working chamber 126 such that it compresses the gas within the working chamber 126. The gas inlet/outlet 128 can be opened such that as the volume of liquid compresses the gas, the compressed gas, now at a second pressure greater than the first pressure, can exit the working chamber 126 via the gas inlet/outlet 128 and be transferred to the storage structure 136 or to another desired location.

At the end of the compression cycle, a valve coupled to the second liquid inlet/outlet 132 can be opened to allow a volume of liquid to be evacuated from the working chamber 126.

As described above, heat energy can be transferred from the gas to the liquid and/or from the heat transfer element 124 to the liquid. Some or all of the volume of liquid can then be evacuated or purged from the working chamber 126 via the liquid purge system 138 and transferred to the thermal management facility 140. If only a portion of the volume of liquid used to compress the gas is evacuated via the liquid purge system 138, the remaining portion or volume of liquid can be moved back into the actuator 122 via the first liquid inlet/outlet 130. Cooled liquid can be transferred from the thermal management facility 140 to the actuator 122 to replace the volume of liquid that has been evacuated.

In alternative embodiments, the thermal management facility 140 can transfer a volume of liquid to the actuator 122 via a separate pump, rather than the pump of the liquid purge system 138. For example, a pump can be provided between the thermal management facility 140 and the actuator 122. In such an embodiment, the liquid purge system 138 can be coupled directly to the thermal management facility 140 via a conduit, but may not be coupled directly to the actuator 122.

In another example use of the compression/expansion device 100, a valve coupled to the second liquid inlet/outlet 132 can be opened to allow a volume of warmed liquid from the thermal management facility 140 to be introduced into the working chamber 126. The valve coupled to the second liquid inlet/outlet 132 can be closed and a valve or valves coupled to the gas inlet/outlet 128 can be opened to allow a quantity of gas at a first pressure (e.g. air) from the storage structure 136 to enter the working chamber 126. As the gas enters the working chamber 126 it expands and forces a volume (or quantity) of liquid (e.g., water) into the actuator 122 via the first liquid inlet/outlet 130. This movement of liquid into the actuator 122 can be used, for example, to generate electricity.

At the end of the expansion cycle, a valve coupled to the gas inlet/outlet 128 can be opened to allow the expanded gas, now at a second pressure less than the first pressure, to be evacuated from the working chamber 126 to the next stage in a multi-stage expansion process or to the atmosphere. As described above, heat energy can be transferred from the liquid to the gas and/or from the heat transfer element 124 to the gas. Some or all of the volume of cooled liquid can then be evacuated or purged from the working chamber 126 and/or actuator 122 and transferred to the thermal management facility 140. Warmed liquid can be transferred from the thermal management facility 140 to the working chamber 126 to replace the volume of liquid that has been evacuated.

FIGS. 2-6 illustrate a compression/expansion device according to another embodiment. A compression/expansion device 200 includes a pressure vessel 220, an actuator 222 coupled to the pressure vessel 220, and a liquid purge system 238 coupled to the pressure vessel 220 and the actuator 222. The compression/expansion device 200 can be used, for example, to compress a gas, such as air, within the pressure vessel 220 and/or to pressurize and/or pump a liquid, such as water. The compression/expansion device 200 can also be used in a compression and expansion system such as a compressed air energy storage system. The compression/expansion device 200 described below refers to the use of water as the liquid and air as the gas for discussion purposes. It should be understood that in alternative embodiments, a different liquid and/or a different gas can be used.

Coupled to the pressure vessel 220 is a gas inlet/outlet conduit 228 (also referred to a as "gas inlet/outlet"), a liquid inlet/outlet conduit 230 (also referred to as "liquid inlet/outlet") and a liquid outlet conduit 232 (also referred to as "liquid outlet"), each in fluid communication with a working chamber 242 of the pressure vessel 220. The pressure vessel 220 can contain within the working chamber 242 at various time periods during a compression and/or expansion cycle, a fluid, such as a liquid (e.g., water) and/or a gas (e.g., air). The fluid can be communicated to and from the working chamber 242 via the liquid inlet/outlet 230 or liquid outlet 232 for the liquid, or gas inlet/outlet 228 for the gas. The compression/expansion device 200 can also include multiple valves 244 coupled to the gas inlet/outlet 228, liquid inlet/outlet 230 and liquid outlet 232 and/or to the pressure vessel 220. The valves 244 can be configured to operatively open and close the fluid communication to and from the working chamber 242. Examples of use of such valves are described in more detail in the Compressor and/or Expander Device applications incorporated by reference above.

The gas inlet/outlet 228 can be coupled to, and in fluid communication with, a source of gas 234, such as, for example, a source of ambient air. The gas inlet/outlet 228 can also be coupled to, and in fluid communication with, a compressed gas storage structure 236 to which the compressed gas can be transferred. Valves 244 can be used to alternately open and close the fluid communication between the working chamber 242 and the source of gas 234 and the working chamber 242 and the storage structure 236. The liquid inlet/outlet 230 can be coupled to the actuator 222 and can be opened and closed via an optional valve 244 to communicate a volume of liquid to and from the working chamber 242 of the pressure vessel 220. The liquid outlet 232 can be coupled to, and in fluid communication with, the liquid purge system 238 and opened to evacuate a volume of the liquid from the working chamber 242 as described in more detail below.

The actuator 222 can be configured the same as, or similar to, actuator 122 described above. The actuator 222 includes a piston 252 disposed within a housing 254 that can be actuated to move liquid between the housing 254 and the working chamber 242 via the liquid inlet/outlet 230. The piston 252 can be coupled to, for example, an electric motor/generator or a hydraulically driven actuator, configured to actuate the piston 252.

The liquid purge system 238 includes a pump 246 coupled to, and in fluid communication with, the liquid outlet 232, and a first conduit 248 coupled to, and in fluid communication with, a thermal management facility 240. The liquid purge system 238 also includes a second conduit 250 coupled to, and in fluid communication with, the pump 246 and the actuator 222. The pump 246 can be actuated to move liquid from the working chamber 242 to the thermal management facility 240. The pump 246 can also be actuated to pump liquid from the thermal management facility 240 to the actuator 222. As described above, the thermal management facility 240 can be, for example, a cooling tower or a settling pond, where heated liquid removed from the working chamber 242 can be cooled to a desired temperature. The cooled liquid can be cycled back into the actuator 222 and used again in a compression process as described in more detail below.

In one example use, a first quantity of gas having a first pressure can be introduced into the working chamber 242 in the direction of arrow A (shown in FIG. 2) via the gas inlet/outlet 228. For example, the valves 244 coupled to the gas inlet/outlet 228 can be actuated to allow a quantity of gas from the source of gas 234 to be introduced into the working chamber 242 of the pressure vessel 220. With the first volume of gas disposed within the pressure vessel 220, the valves 244 coupled to the gas inlet/outlet 228 can be closed and optionally, a valve 244 coupled to the liquid inlet/outlet 230 can be opened. The actuator 222 can then pump a volume of liquid (e.g., water) into the working chamber 242 via the liquid inlet/outlet 230 in the direction of arrow B shown in FIG. 3.

The volume of liquid can be pumped into the working chamber 242 such that it compresses the gas within the working chamber 242. As the volume of liquid compresses the gas within the working chamber 242, the compressed gas, now at a second pressure greater than the first pressure, can exit the working chamber 242 via the gas inlet/outlet 228 and be transferred to the storage structure 236 as shown by arrow C in FIG. 3. For example, valves 244 coupled to the gas inlet/outlet 228 can be actuated to allow the compressed gas to be moved from the working chamber 242 to the storage structure 236.

Figure 4:
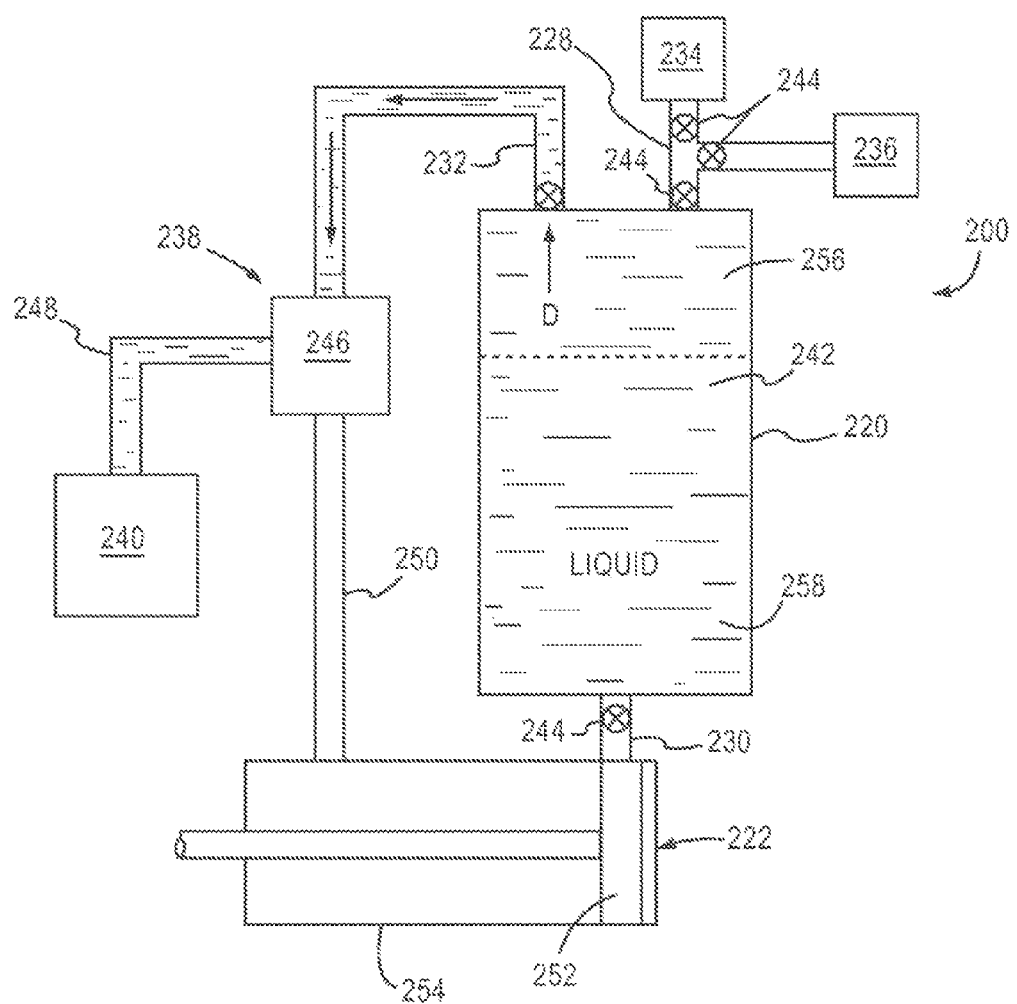
FIG. 4 is a schematic illustration of the compression and/or expansion device of FIG. 2 showing a third time period of a compression cycle.
Figure 5:
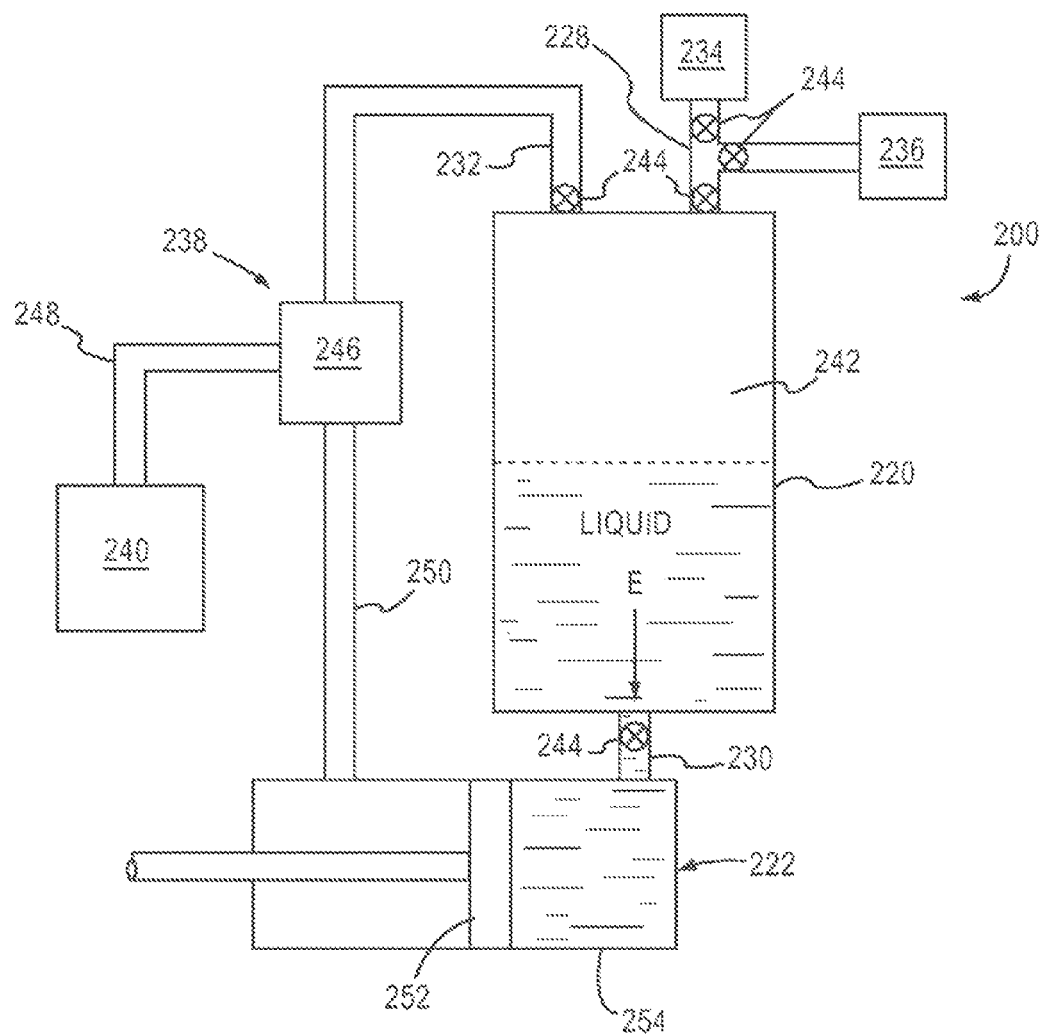
FIG. 5 is a schematic illustration of the compression and/or expansion device of FIG. 2 showing a fourth time period of a compression cycle.

At the end of the compression cycle, a valve 244 coupled to the liquid outlet 232 can be opened to allow a volume of liquid 256 to be evacuated from the working chamber 242 as shown by arrow D in FIG. 4. As described above, at least some of the heat energy from the compression process can be transferred from the gas to the liquid. The evacuated volume of liquid 256 can then be transferred to the thermal management facility 240 via the liquid purge system 238. For example, the volume of liquid 256 can be pumped through the liquid outlet 232 and then pumped through the conduit 248 and into the thermal management facility 240. The remaining portion or volume of liquid 258 within the working chamber 242 can be moved back into the actuator 222 in the direction of arrow E via the liquid inlet/outlet 230, as shown in FIG. 5. Cooled liquid from the thermal management facility 240 can be transferred back to the actuator 222 to replace the volume of liquid 256 that has been evacuated as shown by arrow F in FIG. 6. The above process can then be repeated to continuously compress gas.

In some embodiments, the cooled liquid can be transferred from the thermal management facility 240 to the actuator 222 after the remaining liquid 258 in the working chamber 242 is moved back into the actuator 222. In some embodiments, the cooled liquid can be transferred from the thermal management facility 240 to the actuator 222 simultaneously with the remaining liquid 258 in the working chamber 242 being moved back into the actuator 222. In some embodiments, the cooled liquid can be transferred from the thermal management facility 240 directly back to the working chamber 242.

Figure 6:
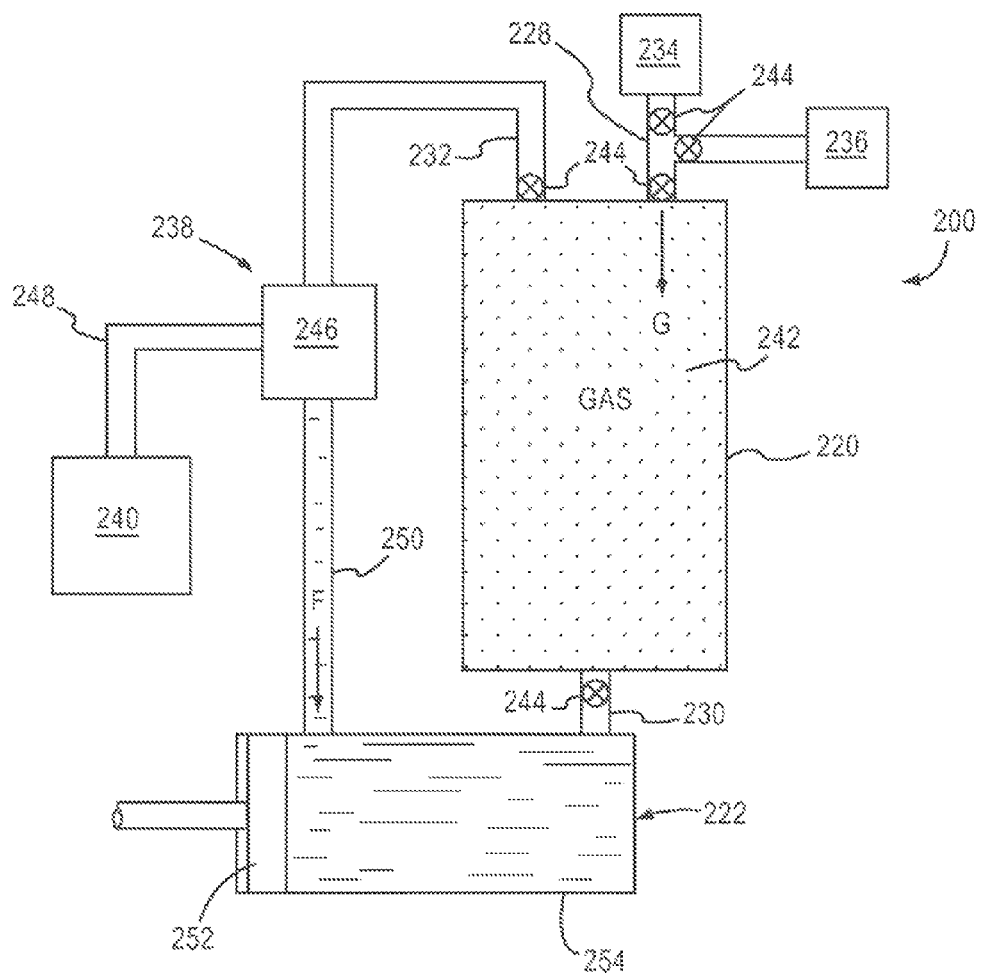
FIG. 6 is a schematic illustration of the compression and/or expansion device of FIG. 2 showing a fifth time period of a compression cycle.

In some embodiments, as the process is repeated, a quantity of gas can be introduced into the working chamber 242 as shown by arrow G in FIG. 6 simultaneously with the cooled liquid being transferred into the actuator 222. In some embodiments, a quantity of gas can be introduced into the working chamber 242 simultaneously with the remaining liquid 258 in the working chamber 242 being moved back into the actuator 222. In some embodiments, a quantity of gas can be introduced into the working chamber 242 after the remaining liquid 258 in the working chamber 242 has been moved back into the actuator 222. In some embodiments, a quantity of gas can be introduced into the working chamber 242 simultaneously with the remaining liquid 258 in the working chamber 242 being moved back into the actuator 222 and simultaneously with the cooled liquid being transferred into the actuator 222.

In the above example, an unspecified volume of liquid 256 was evacuated from the pressure vessel 220. It should be understood that various volumes of liquid can be evacuated. For example, in some embodiments, 5%, 10%, 15%, 20%, 25%, 30%, 35%, 40%, 45%, 50%, 55%, 60%, 65%, 70%, 75%, 80%, 85%, 90%, 95% or 100% of the liquid used to compress the gas can be evacuated from the working chamber 242 with the liquid purge system 238.

Figure 7:
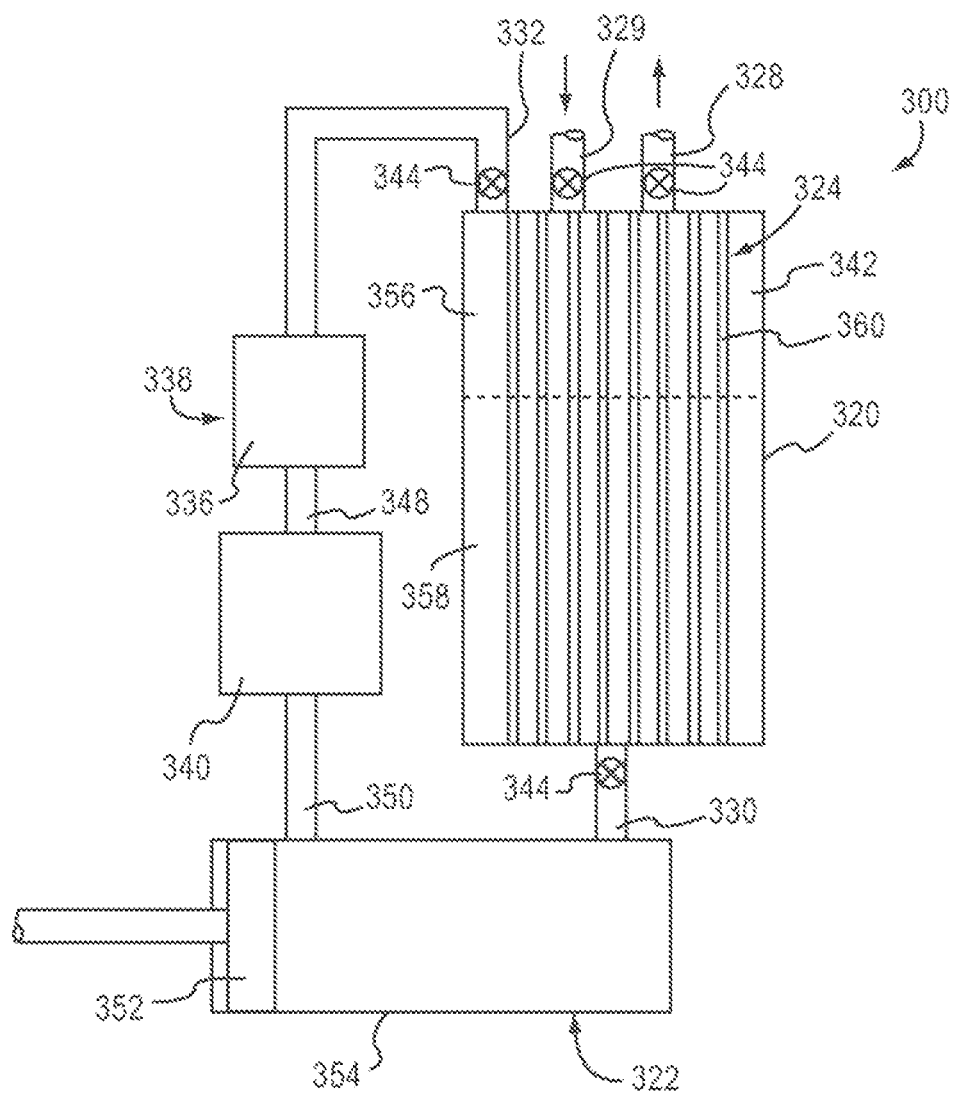
FIG. 7 is a schematic illustration of a compression and/or expansion device according to another embodiment.

FIG. 7 illustrates another embodiment of a compression/expansion device. A compression/expansion device 300 includes a pressure vessel 320, an actuator 322 coupled to the pressure vessel 320, and a liquid purge system 338 coupled to a working chamber 342 of the pressure vessel 320 and the actuator 322. The compression/expansion device 300 can be used, for example, to compress a gas, such as air, within the working chamber 342 and/or to pressurize and/or pump a liquid, such as water. The compression/expansion device 300 can also be used in a compression and expansion system such as a compressed air energy storage system and/or other suitable applications as described above.

The compression/expansion device 300 includes a gas inlet 329, a gas outlet 328, and a liquid inlet/outlet 330, each coupled to the pressure vessel 320 and in fluid communication with working chamber 342 of the pressure vessel 320. The pressure vessel 320 can contain within the interior region 342 at various time periods during a compression and/or expansion cycle, a fluid, such as a liquid (e.g., water) and/or a gas (e.g., air). As described above for compression/expansion device 200, the compression/expansion device 300 can also include multiple valves 344 each coupled to one of the gas inlet 329, the gas outlet 328, the liquid inlet/outlet 330, and/or to the pressure vessel 320. The valves 344 can be configured to operatively open and close the fluid communication to and from the pressure vessel 320.

The gas inlet 329 can be coupled to, and in fluid communication with, a source of gas (not shown), such as, for example, a source of ambient air. The gas outlet 328 can be configured to communicate gas from the working chamber 342 to another location, such as, for example, a compressed gas storage structure (not shown). The liquid inlet/outlet 330 can be coupled to the actuator 322 and can be opened and closed via a valve 344 to communicate liquid to and from the working chamber 342 to the actuator 322.

The compression/expansion device 300 also includes a liquid outlet 332 coupled to, and in fluid communication with, the liquid purge system 338 and the working chamber 342. The liquid outlet 332 can be opened to evacuate a volume of the liquid from working chamber 342 as described above for compression/expansion device 200.

The actuator 322 can be configured the same as, or similar to, actuator 122 and/or actuator 222 described above. The actuator 322 includes a piston 352 disposed within a housing 354 that can be actuated to move liquid between the housing 354 and the working chamber 342 via the liquid inlet/outlet 330. The piston 352 can be coupled to, for example, an electric motor configured to actuate the piston 352.

The liquid purge system 338 includes a pump (not shown) coupled to, and in fluid communication with, the liquid outlet 332, and a first conduit 348 coupled to, and in fluid communication with, a thermal management facility 340. The pump can be actuated to move liquid from the working chamber 342 to the thermal management facility 340. The thermal management facility 340 can include a pump (not shown) configured to pump cooled liquid to the actuator 322 via a conduit 350.

In this embodiment, the compression/expansion device 300 includes a heat transfer element 324 in the form of multiple elongate members 360 arranged in a bundle and extending vertically within the working chamber 342. The elongate members 360 can be coupled together with a strap or band (not shown) that is coupled to the wall of the pressure vessel 320 with a suitable coupling mechanism (not shown), such as, for example, a bracket or clamp bolted to the wall of the pressure vessel 320. The elongate members 360 can be solid or tubular (e.g., define a lumen). As liquid flows into the working chamber 342, the liquid can flow between the elongate members 360 and compress the gas (e.g., air) disposed within the working chamber 342. Heat energy can be transferred to the liquid and/or to the elongate members 360 of the heat transfer element 324.

The compression/expansion device 300 can be used in the same or similar manner as described above for compression/expansion device 200. In one example use, a first quantity of gas having a first pressure can be introduced into the working chamber via the gas inlet 329. With the first quantity of gas disposed within the working chamber 342, the actuator 322 can then pump a volume of liquid (e.g., water) into the working chamber 342 via the liquid inlet/outlet 330 such that the liquid compresses the gas within the working chamber 342. As the volume of liquid compresses the gas, the compressed gas, now at a second pressure greater than the first pressure, can exit the working chamber 342 via the gas outlet 328 and be transferred to a desired location. As the liquid flows within the pressure vessel 320 the liquid can flow between the elongate members 360 such that at least some of the heat generated during compression can be transferred to the elongate members 360. As described above, at least some of the heat energy generated can be transferred from the gas to the liquid.

With the elongate members 360 disposed within the working chamber 342, the liquid is effectively separated into relatively long, narrow columns, which reduces the amount of vertical mixing of the liquid. This leads to vertical stratification of the liquid columns. The resulting temperature at a top layer portion of the liquid, i.e., closest to the gas/liquid interface where heat energy is transferred from the gas to the liquid, will be greater than other portions of the liquid that are further away from the gas/liquid interface. When the compression cycle is complete, this higher temperature layer or volume of liquid can then be evacuated from the working chamber 342 with the liquid purge system 338, as described above for previous embodiments.

Specifically, at the end of the compression cycle, a volume of liquid 356 can be evacuated from the working chamber 342 and transferred to the thermal management facility 340 via the liquid purge system 338. The remaining portion or volume of liquid 358 within the working chamber 342 can be moved back into the actuator 322 via the liquid inlet/outlet 330. Cooled liquid from the thermal management facility 340 can be transferred to the actuator 322 to replace the volume of liquid 356 that has been evacuated. The above process can then be repeated.

The amount of heat energy removed from the working chamber 342 can thus be controlled by the amount of liquid removed, and by the location within the working chamber 342 from which the liquid is removed. For example, if there is relatively little vertical mixing of the liquid, the heat energy transferred from the gas to the liquid can be relatively concentrated near the gas/liquid interface, and a relatively large portion of the total transferred heat energy can be removed from the working chamber 342 by removing a relatively small portion of the liquid.

Figure 8:
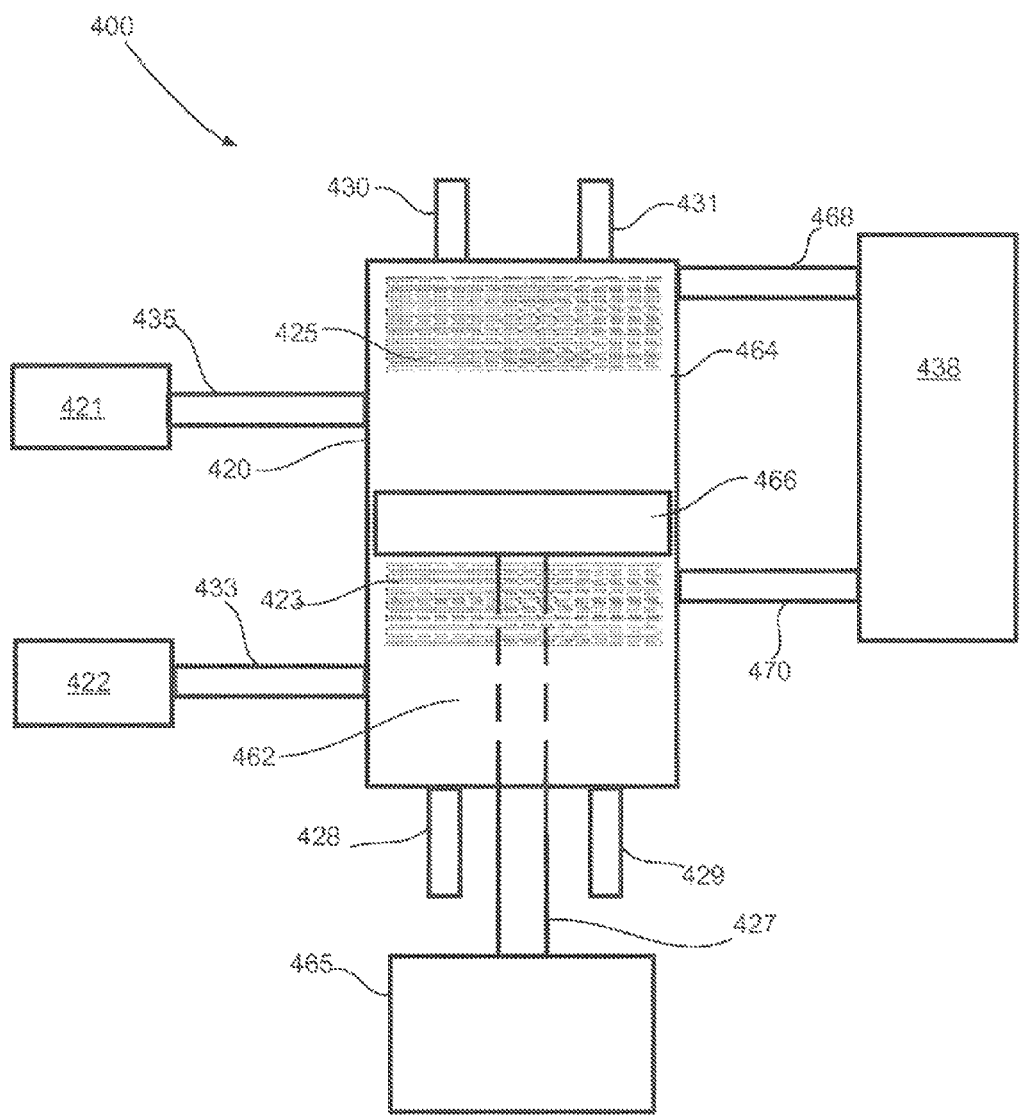
FIG. 8 is a schematic illustration of a compression and/or expansion device, according to another embodiment.

FIG. 8 schematically illustrates a portion of a compressor/expander device according to another embodiment. A compressor/expander device 400 can include one or more pressure vessels (cylinders) 420 having a first working chamber 462 and a second working chamber 464, an actuator 421 connected to a piston 466 via a piston rod 427, and first heat transfer element 423 and a second heat transfer element 425 disposed within the pressure vessel 420. The compression/expansion device 400 can be used in the same or similar manner as described above for previous embodiments, to compress and/or expand a gas (e.g., air). In this embodiment, the piston 466 is used to move a liquid within the pressure vessel 420 to compress and/or expand a gas within the pressure vessel 420.

More specifically, the first heat transfer element 423 is disposed within the first working chamber 462 and the second heat transfer element 425 is disposed within the second working chamber 464. The compressor/expander device 400 can be used, for example, to compress and/or expand a gas, such as air, within the first working chamber 462 or the second working chamber 464. The compressor/expander device 400 can be used, for example, in a CAES system. The pressure vessel 420 can include an inlet conduit 428 and an outlet conduit 429 in fluid communication with the first working chamber 462 and an inlet conduit 430 and an outlet conduit 431 in fluid communication with the second working chamber 464. The first working chamber 462 and the second working chamber 464 can contain, at various time periods during a compression and/or expansion cycle, a quantity of the gas (e.g., air) and a quantity of the liquid (e.g., water) that can be communicated to and from the working chambers via the inlet/outlet conduits. Optionally, the pressure vessel 420 can include one or more additional conduits in fluid communication with the first working chamber 462 or the second working chamber 464 specifically dedicated to communicating gas or liquid to or from the first and second working chambers 462, 464. The compressor/expander device 400 can also include multiple valves (not shown in FIG. 8) coupled to the inlet/outlet conduits 428, 429, 430, and 431 and/or to the pressure vessel 420. The valves can be configured to operatively open and close the fluid communication to and from the working chambers 462 and 464. Examples of use of such valves are described in more detail in the Compressor and/or Expander Device applications incorporated by reference above.

The actuator 465 can be any suitable mechanism for causing reciprocal movement of the piston 466 within the pressure vessel 420. As the piston 466 is moved back and forth within the pressure vessel 420, the volume of the first working chamber 462 and the second working chamber 464 and/or the portion of the volume of the first working chamber 462 and the second working chamber 464 that can be occupied by gas can be selectively changed. The actuator 465 can be for example, an electric motor or a hydraulically driven actuator such as, for example, the hydraulic actuators described in the Ingersoll I application incorporated herein by reference above. The actuator 465 can be coupled to the piston 466 via the piston rod 427 and used to move the piston 466 back and forth within the interior region of the pressure vessel 420. For example, the working chamber 462 can be defined by the cylinder 420 and the bottom face of piston 466. Similarly, the working chamber 464 can be defined by the cylinder 420 and the top face of the piston 466. In this manner, the piston 466 is movably disposed within the interior region of the cylinder 420 and can divide the interior region between a first interior region (working chamber 462) and a second interior region (working chamber 464).

As the piston 466 moves back and forth within the interior region of the cylinder 420, a volume of the first working chamber 462 and a volume of the second working chamber 464 will each change. For example, the piston 466 can be moved between a first position (e.g., top dead center) in which the first working chamber 462 includes a volume of fluid greater than a volume of fluid in the second working chamber 464, and a second position (e.g., bottom dead center) in which the second working chamber 464 includes a volume of fluid greater than a volume of fluid in the first working chamber 462. As used herein, "fluid" means a liquid, gas, vapor, suspension, aerosol, or any combination of thereof. At least one seal member (not shown), such as, for example, a rolling seal member can be disposed within the first working chamber 462 and the second working chamber 464 of the cylinder 420 and can be attached to the piston 466. The arrangement of the rolling seal member(s) can fluidically seal the first working chamber 462 and the second working chamber 464 as the piston 466 moves between the first position (i.e., top dead center) and the second position (i.e., bottom dead center). Examples and use of a rolling seal member are described in more detail in the Ingersoll III application incorporated by reference above.

In some embodiments, the piston 466 is moved within the pressure vessel 420 to compress a gas, such as air, within the pressure vessel 420. In some embodiments, the piston 466 can be configured to be single-acting (e.g., actuated in a single direction to compress and/or expand gas). As shown in FIG. 8, the compressor/expander device 400 is configured to be double-acting in that the piston 466 can be actuated in two directions. In other words, the piston 466 can be actuated to compress and/or expand gas (e.g., air) in two directions. For example, in some embodiments, as the piston 466 is moved in a first direction, a first volume of a fluid (e.g., water, air, and/or any combination thereof) having a first pressure can enter the first working chamber 462 of the cylinder 420 on the bottom side of the piston 466. In addition, a second volume of the fluid having a second pressure can be compressed by the top side of the piston 466 in the second working chamber 464. The gas portion of the second volume of fluid can then exit the second working chamber 464. When the piston 466 is moved in a second direction opposite the first direction, the gas portion of the first volume of fluid within the first working chamber 462 can be compressed by the piston 466. The gas portion of the first volume of fluid can then exit the first working chamber 462 having a third pressure greater than the first pressure, and simultaneously a third volume of fluid can enter the second working chamber 464.

The heat transfer element 423 disposed within the first working chamber 462 and the heat transfer element 425 disposed within the second working chamber 464 can be a variety of different configurations, shapes, sizes, structures, etc. to provide a relatively high surface area per unit volume or mass that can be in contact with the gas (e.g., air) as it is being compressed or expanded. In this embodiment, as shown in FIG. 8, the heat transfer element 423 is disposed near the bottom surface of the piston 466 and the heat transfer element 425 is disposed at a top portion of the second working chamber 464. In some embodiments, the heat transfer element 423 disposed within the first working chamber 462 can be attached to the bottom face of the piston 466. Similarly, in some embodiments, the heat transfer element 425 disposed within the second working chamber 464 can be attached to the top face of the piston 466, as described in further detail herein. In such embodiments, the heat transfer elements 423, 425 can move with the piston 466 as it is actuated.

In some embodiments, it may be desirable to form the heat transfer elements 424 with a material that can provide high thermal conductivity. For example, the heat transfer elements 424 (i.e., the heat transfer element 423 and the heat transfer element 424) can be formed with metals (e.g. stainless steel) in the form of, for example, sheet or wire, carbon fiber, nano-materials, and hybrid or composite materials (e.g. carbon polymer compounds) which have anti-corrosion properties, are lighter weight, and are less expensive than some metallic materials. The heat transfer elements 424 can be, for example, substantially similar to the heat transfer element 324 described with respect to FIG. 7.

The compressor/expander device 400 also includes an actuator 421 and an actuator 422 that can each be configured the same as, or similar to, actuator 122 and/or actuator 222 described above. The actuators 421 and 422 can each include a piston (not shown) disposed within a housing (not shown). The actuator 422 can be actuated to move liquid between the housing and the first working chamber 462 via a liquid inlet/outlet 433, and the actuator 421 can be actuated to move liquid between the housing and the second working chamber 464 via a liquid inlet/outlet 435. The pistons of the actuators 421 and 422 can each be coupled to, for example, an electric motor or hydraulic actuator configured to actuate the pistons.

The compression/expansion device 400 can also include a first liquid outlet 468 coupled to, and in fluid communication with, a liquid purge system 438 and the first working chamber 462, and a second liquid outlet 470 coupled to, and in fluid communication with, the liquid purge system 438 and the second working chamber 464. The liquid purge system 438 can be configured the same as or similar to, and function the same as or similar to, the liquid purge systems 238 and 338 described above. The first liquid outlet 468 can be opened to evacuate a volume of the liquid from the first working chamber 462, and the second liquid outlet 470 can be opened to evacuate a volume of the liquid from the second working chamber 464, as described above for previous embodiments.

The liquid purge system 438 can include a first pump (not shown) coupled to, and in fluid communication with, the first liquid outlet 468, and a first conduit (not shown) coupled to, and in fluid communication with, a thermal management facility (not shown). The liquid purge system 438 can also include a second pump (not shown) coupled to, and in fluid communication with, the second liquid outlet 470, and a second conduit (not shown) coupled to, and in fluid communication with, the thermal management facility. The pumps can each be actuated to move liquid from the first chamber 462 and the second working chamber 464 to the thermal management facility. The thermal management facility can include a pump (not shown) configured to pump cooled liquid to the actuator 421 and 422. In some embodiments, the liquid purge system 438 and actuators 421 and 422 can be subsystems of a liquid management system that includes a thermal management facility.

In use, when the piston 466 is actuated to compress a gas within the pressure vessel 420, the liquid purge system 438 can be used to remove heat generated during the compression process. For example, when the piston 466 is actuated to compress a gas within the second working chamber 464, heat generated during compression can be transferred to the heat transfer element 425 and then from the heat transfer element 425 and by pumping a volume of liquid into the second working chamber 464 using the actuator 421. The liquid pumped into the second working chamber 464 can also contribute to the compression of the gas as described above for previous embodiments. During the compression process, the resulting temperature at a top layer portion of the liquid, i.e., closest to the gas/liquid interface where heat energy is transferred from the gas to the liquid, will be greater than other portions of the liquid that are further away from the gas/liquid interface. When the compression cycle is complete (e.g., when the piston 466 reaches the end of its stroke at a top portion of the second working chamber 464) this higher temperature layer or volume of liquid can then be evacuated from the second working chamber 464 via the conduit 470 with the liquid purge system 438, as described above for previous embodiments.

Specifically, at the end of the compression cycle, a volume of liquid can be evacuated from the second working chamber 464 and transferred to the thermal management facility via the liquid purge system 438. The remaining portion or volume of liquid within the second working chamber 464 can be moved back into the actuator 421 via the liquid inlet/outlet 435. Cooled liquid from the thermal management facility can be transferred to the actuator 421 to replace the volume of liquid that has been evacuated. The same process occurs when the piston 466 is moved in the opposite direction to compress gas within the first working chamber 462.

The amount of heat energy removed from the working chambers 462 and 464 can thus be controlled by the amount of liquid removed, and by the location within the working chambers 462, 464 from which the liquid is removed. For example, if there is relatively little vertical mixing of the liquid, the heat energy transferred from the gas to the liquid can be relatively concentrated near the gas/liquid interface, and a relatively large portion of the total transferred heat energy can be removed from the working chambers 462, 464 by removing a relatively small portion of the liquid.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. Additionally, the specific configurations of the various components of a compression/expansion device can also be varied. For example, the size and specific shape of the various components can be different than the embodiments shown, while still providing the functions as described herein.

Although not shown, the compression/expansion device 200 can optionally include a heat transfer element disposed within the working chamber 242 of the pressure vessel 220 as described above for compression/expansion device 100 and compression/expansion device 300. In such an embodiment, heat energy from a compression process can be transferred to the heat transfer element and to the liquid used to compress the gas.

As previously described, in some embodiments, a compression and/or expansion device as described herein can be used within a multi-stage air compression/expansion system. In some such embodiments, a liquid purge system can be used to evacuate a volume or portion of liquid from one stage of the multi-stage compression/expansion system, and transfer the evacuated liquid to thermal management facility as described above. In some embodiments, a liquid purge system can be used to evacuate a volume or portion of liquid from one stage of the multi-stage compression/expansion system, and transfer the evacuated liquid to another stage of the system.

What is claimed is:
1. An apparatus suitable for use in a compressed gas-based energy storage and recovery system, the apparatus comprising:
   a compressor subassembly comprising:
      a pressure vessel having a working chamber adapted to contain a liquid and a gas; and
      a hydraulic actuator fluidically coupled to the pressure vessel and comprising a working piston disposed therein for reciprocating movement; and
   a liquid purge system fluidically coupled to the hydraulic actuator, wherein:
      the working piston is moveable in a first direction to displace a liquid from the hydraulic actuator to the working chamber of the pressure vessel to compress gas therein and to absorb heat energy from the gas being compressed;
      the liquid purge system is adapted to transfer a portion of heated liquid from the compressor subassembly to the liquid purge system; and
      the working piston is moveable in a second direction to return a remaining portion of heated liquid from the working chamber of the pressure vessel to the hydraulic actuator.

2. The apparatus of claim 1, wherein the liquid purge system is further adapted to transfer cooled liquid to the compressor subassembly to replace the portion of heated liquid transferred to the liquid purge system.

3. The apparatus of claim 2, further comprising a thermal management system fluidically coupled to the liquid purge system and adapted to cool heated liquid received from the liquid purge system.

4. The apparatus of claim 1, wherein the portion of heated liquid transferred to the liquid purge system comprises a predetermined volume of liquid selected to remove a desired amount of heat energy from the compressor subassembly.

5. The apparatus of claim 1, further comprising a heat transfer element disposed within the working chamber of the pressure vessel, the heat transfer element being adapted to receive heat energy from the gas being compressed.

6. The apparatus of claim 5, wherein the heat transfer element is adapted to transfer heat energy received from the compressed gas to the liquid in the working chamber of the pressure vessel.

7. The apparatus of claim 1, wherein:
   the compressor subassembly comprises a compressor/expander subassembly;
   the pressure vessel is adapted to expand gas in the working chamber to displace a second liquid from the working chamber to the hydraulic actuator and to transfer heat energy to the gas being expanded; and
   the liquid purge system is adapted to transfer a portion of the second liquid from the compressor/expander subassembly to the liquid purge system.

8. The apparatus of claim 7, wherein the liquid purge system is further adapted to transfer heated liquid to the compressor/expander subassembly to replace the portion of the second liquid transferred to the liquid purge system.

9. The apparatus of claim 8, further comprising a thermal management system fluidically coupled to the liquid purge system and adapted to heat cooled liquid received from the liquid purge system.

10. The apparatus of claim 1, further comprising a second actuator coupled to the working piston and adapted to move the working piston in the first and second directions.

11. A method for operating a compressed gas-based energy storage and recovery system, the system comprising:
   a compressor subassembly comprising:
      a pressure vessel having a working chamber adapted to contain a liquid and a gas; and a hydraulic actuator fluidically coupled to the pressure vessel and comprising a working piston disposed therein for reciprocating movement; and a liquid purge system fluidically coupled to the hydraulic actuator, the method comprising the steps of:

moving the working piston in a first direction to displace a liquid from the hydraulic actuator to the working chamber of the pressure vessel to compress gas therein and to absorb heat energy from the gas being compressed;

transferring a portion of heated liquid from the compressor subassembly to the liquid purge system; and moving the working piston in a second direction to displace a remaining portion of heated liquid from the working chamber of the pressure vessel to the hydraulic actuator.

12. The method of claim 11, further comprising transferring cooled liquid to the compressor subassembly to replace the portion of the heated liquid transferred to the liquid purge system.

13. The method of claim 12, wherein the system further comprises a thermal management system fluidically coupled to the liquid purge system, the method further comprising cooling, by the thermal management system, heated liquid received from the liquid purge system.

14. The method of claim 11, wherein the portion of heated liquid transferred to the liquid purge system comprises a predetermined volume of liquid selected to remove a desired amount of heat energy from the compressor subassembly.

15. The method of claim 11, wherein the system further comprises a heat transfer element disposed within the working chamber of the pressure vessel, the method further comprising receiving, by the heat transfer element, heat energy from the gas being compressed.

16. The method of claim 15, further comprising transferring, by the heat transfer element, heat energy received from the compressed gas to the liquid in the working chamber of the pressure vessel.

17. The method of claim 11, wherein the compressor subassembly comprises a compressor/expander subassembly, the method further comprising:

expanding gas in the working chamber of the pressure vessel to displace a second liquid from the working chamber to the hydraulic actuator and to transfer heat energy to the gas being expanded; and transferring a portion of the second liquid from the compressor/expander subassembly to the liquid purge system.

18. The method of claim 17, further comprising transferring heated liquid to the compressor/expander subassembly to replace the portion of the second liquid transferred to the liquid purge system.

19. The method of claim 18, wherein the system further comprises a thermal management system fluidically coupled to the liquid purge system, the method further comprising heating, by the thermal management system, cooled liquid received from the liquid purge system.

20. The method of claim 11, wherein the system further comprises a second actuator coupled to the working piston and adapted to move the working piston in the first and second directions.

* * * * *